(12) United States Patent
Hale et al.

(10) Patent No.: US 12,709,911 B1
(45) Date of Patent: Aug. 18, 2026

(54) SEISMIC CLIP ASSEMBLY FOR WALL CLADDINGS

(71) Applicant: Innovatech Systems, LLC, Kanarraville, UT (US)

(72) Inventors: Robert Hale, Rogers, AR (US); Jacob Gillip, Rogers, AR (US); Craig W Storch, Cedar City, UT (US)

(73) Assignee: Innovatech Systems, LLC, Kanarraville, UT (US)

( * ) Notice: Subject to any disclaimer, the term of this patent is extended or adjusted under 35 U.S.C. 154(b) by 0 days.

(21) Appl. No.: 19/391,966

(22) Filed: Nov. 17, 2025

(51) Int. Cl.

| | |
|---|---|
| ***E04H 9/02*** | (2006.01) |
| ***E04B 1/24*** | (2006.01) |
| ***E04B 1/98*** | (2006.01) |
| ***E04B 2/88*** | (2006.01) |
| ***E04F 13/08*** | (2006.01) |
| ***F16B 5/02*** | (2006.01) |
| ***F16B 12/20*** | (2006.01) |

(52) U.S. Cl.
CPC ......... *E04H 9/021* (2013.01); *E04F 13/0805* (2013.01); *E04B 2001/2415* (2013.01); *E04B 1/98* (2013.01); *E04B 2/88* (2013.01); *E04H 9/0215* (2020.05); *E04H 9/024* (2013.01); *F16B 5/0266* (2013.01); *F16B 12/2063* (2013.01)

(58) Field of Classification Search
CPC ....... E04H 9/021; E04H 9/0215; E04H 9/024; E04F 13/0805; E04B 1/98; E04B 2/88; E04B 2001/2415; F16B 5/0266; F16B 12/2063
See application file for complete search history.

(56) References Cited

U.S. PATENT DOCUMENTS

| | | | | |
|---|---|---|---|---|
| 4,845,909 A * | 7/1989 | Bailey | E04F 13/081 52/510 |
| 9,677,268 B2 | 6/2017 | Knight et al. | |
| 2003/0223659 A1* | 12/2003 | Lee | E04H 9/023 384/36 |
| 2008/0017780 A1 | 1/2008 | Downey et al. | |
| 2014/0338281 A1* | 11/2014 | Russell | E04C 3/08 52/664 |

(Continued)

FOREIGN PATENT DOCUMENTS

| | | | |
|---|---|---|---|
| CN | 212026735 U * | 11/2020 | |
| KR | 10-2177926 B1 | 11/2020 | |
| KR | 20240134427 A * | 9/2024 | E06B 3/54 |

*Primary Examiner* — Omar F Hijaz
(74) *Attorney, Agent, or Firm* — Gurr & Brande, PLLC; Robert A. Gurr

(57) ABSTRACT

A seismic clip assembly features a U-shaped clip fastened to a structure at its base, and a threaded rod passing through a first flange and a second flange of the U-shaped clip, the threaded rod coupling the U-shaped clip to a subframe structure (e.g., HSS post), with the HSS post fastened to an IMP (or other cladding system). The threaded rod passes through a first elongated aperture extending longitudinally along a portion of a first side of the HSS post, and a second elongated aperture extending longitudinally along a portion of a second side of the HSS post, each elongated aperture forming a vertical slot in the HSS post. The seismic clip assembly is interposed between a structure and a wall cladding system to dampen in-plane movement between the two, ensuring integrity of the wall cladding system when the structure is under a load.

6 Claims, 5 Drawing Sheets

(56) References Cited

U.S. PATENT DOCUMENTS

2016/0265217 A1* 9/2016 Hayes .................. E04B 1/1903
2018/0334809 A1* 11/2018 Smart ................ E04F 13/0846
2020/0362557 A1* 11/2020 Lee .......................... E04B 9/18
2022/0098888 A1* 3/2022 Richard ................. E04H 9/021

* cited by examiner

SEISMIC CLIP ASSEMBLY FOR WALL CLADDINGS

CROSS-REFERENCE TO RELATED APPLICATIONS

Not applicable.

TECHNICAL FIELD

The present disclosure relates to seismic clips for use in building construction. More particularly, the present disclosure relates to a seismic clip assembly for use with external wall claddings.

BACKGROUND

External wall cladding systems are a fundamental component in modern construction, providing both aesthetic appeal and functional benefits such as insulation, weather resistance, and structural support. These systems encompass a variety of materials, including insulated metal panels (IMPs), wood, stone, metal, vinyl, and glass. Despite their widespread use, these cladding systems are not typically designed to accommodate significant in-plane movement. This limitation can potentially compromise the weathertight seals, structural integrity, and physical properties of the individual cladding systems.

Historically, the issue of in-plane movement was less critical in the early use of IMP systems, as metal buildings seldom exceeded two stories in height. Consequently, the design considerations for seismic loads were minimal, and in-plane movement was generally negligible. However, the construction landscape has evolved, with IMP buildings now reaching several hundred feet in height. This increase in building height has amplified the importance of managing in-plane movement due to seismic events, wind drift, and other factors.

The inability of current cladding systems to effectively manage in-plane deflections poses significant risks. Seismic activity, in particular, can induce substantial in-plane forces that these systems are not equipped to handle, potentially leading to failure of the weathertight seals and compromising the structural integrity of the building envelope. Similarly, wind drift can cause lateral movements that exceed the design tolerances of traditional cladding materials, resulting in damage or failure.

These challenges highlight the critical need for improved solutions that can accommodate in-plane deflections while maintaining the functional and structural integrity of wall cladding systems. Addressing this need is essential to ensure the safety, durability, and performance of modern high-rise buildings and other structures utilizing these cladding materials.

The present disclosure seeks to solve these and other problems.

SUMMARY OF EXAMPLE EMBODIMENTS

In some embodiments, a seismic clip assembly comprises a U-shaped clip fastened to a structure at its base, and a threaded rod (or bolt) passing through a first flange and a second flange of the U-shaped clip, the threaded rod coupling the U-shaped clip to a subframe structure, such as a hollow structural section (HSS) post, with the subframe structure fastened to an IMP (or other cladding system). In some embodiments, the threaded rod passes through a first aperture extending longitudinally along a portion of a first side of the subframe structure, and second aperture extending longitudinally along a portion of a second side of the subframe structure, each aperture forming a vertical slot in the subframe structure.

In some embodiments, the threaded rod may comprise a spring mechanism, such as a coil spring, rubber shim, block, or other compressible material, configured to dampen in-plane wall movement and provide energy dissipation to applied in-plane wall loads.

DETAILED DESCRIPTION OF EXAMPLE EMBODIMENTS

Figure 1:
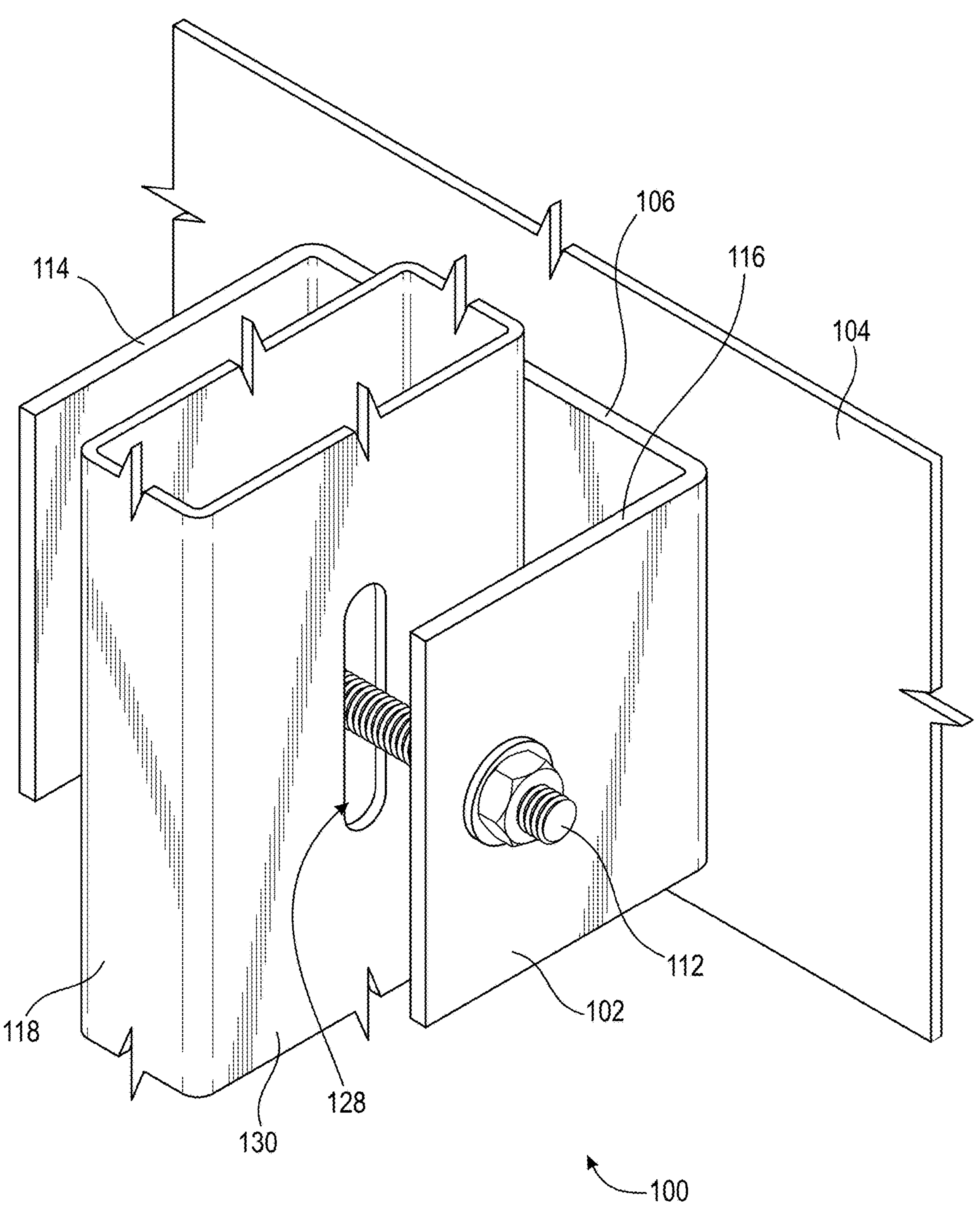
FIG. 1 illustrates a side perspective view of a seismic clip assembly coupled to a structure (without wall cladding shown for ease of understanding the assembly)
Figure 2:
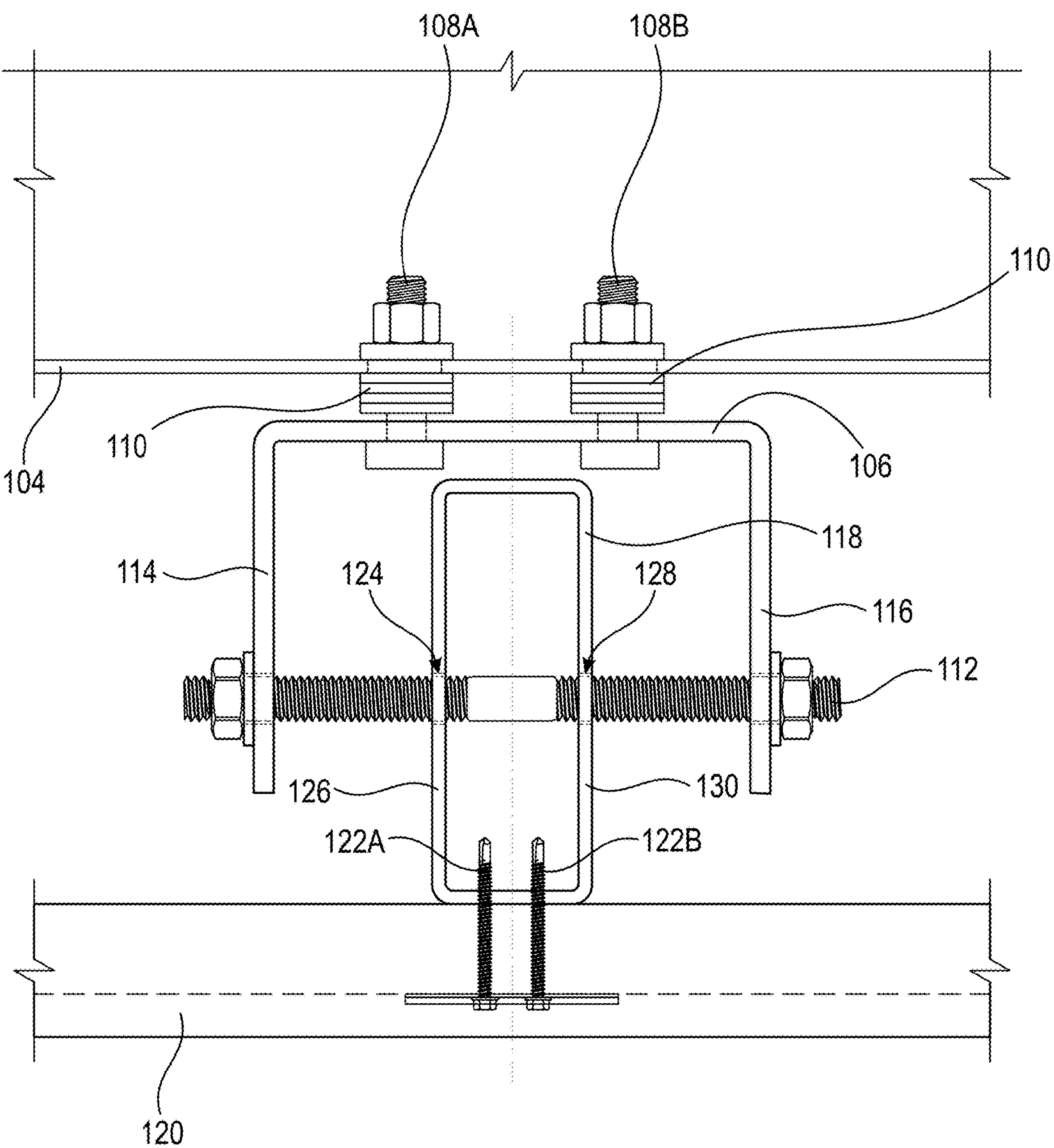
FIG. 2 illustrates a top plan view of a seismic clip assembly without springs coupling wall cladding (e.g., IMP) to a structure.
Figure 3:
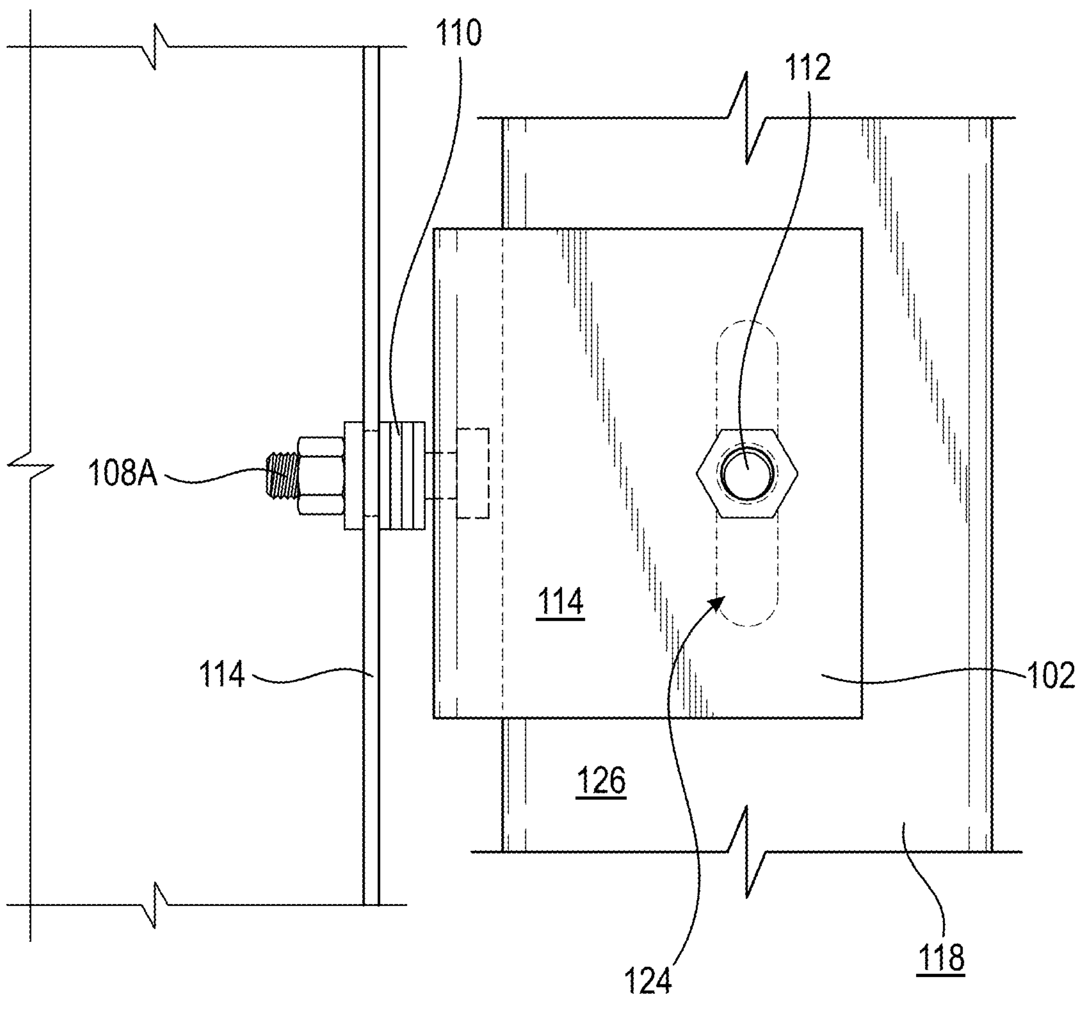
FIG. 3 illustrates a side elevation view of a seismic clip assembly coupled to a structure (without wall cladding shown for ease of understanding the assembly)
Figure 4:
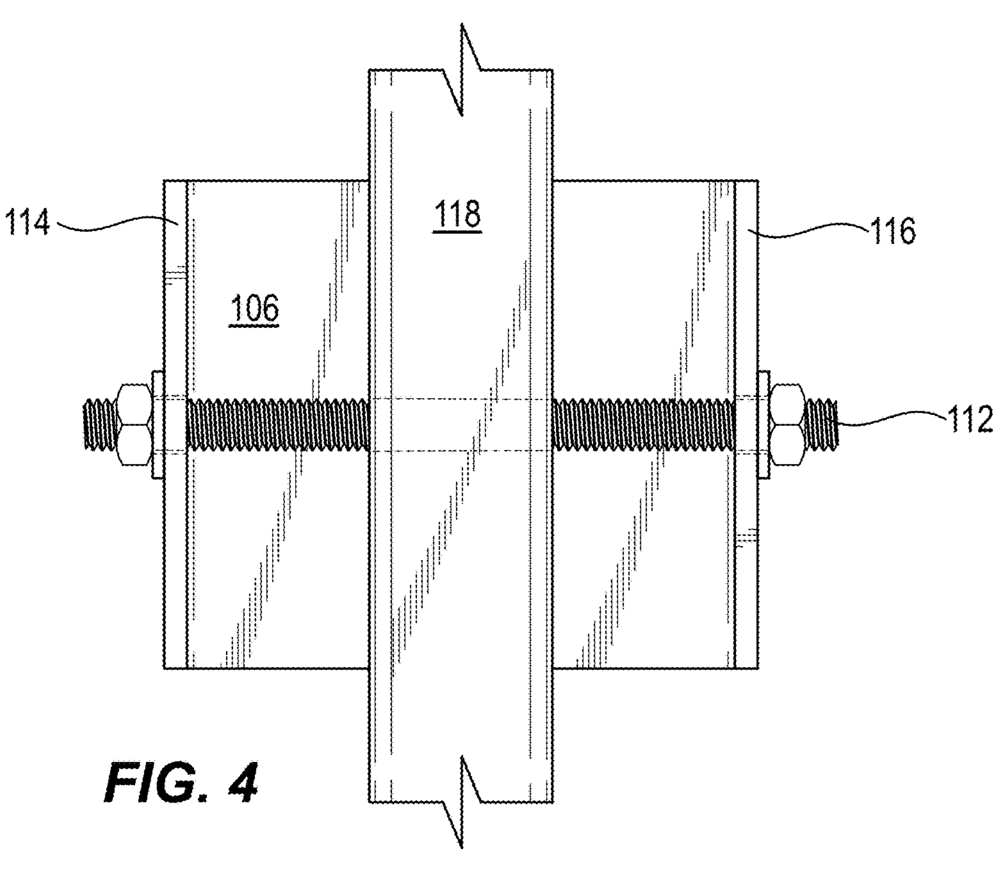
FIG. 4 illustrates a front elevation view of a seismic clip assembly without springs.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items.

When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for improved solutions that can accommodate in-plane deflections while maintaining the functional and structural integrity of wall cladding systems. Addressing this need is essential to ensure the safety, durability, and performance of modern high-rise buildings and other structures utilizing these cladding materials. The seismic clip assembly disclosed herein solves these and other problems.

Referring now to FIGS. 1-4, in some embodiments, a seismic clip assembly 100 comprises a U-shaped clip 102 fastened to a structure 104 at its base 106, such as via bolts 108A-B, to ensure a fixed position (i.e., non-movable). While bolts 108A-B are shown, other fastening mechanisms may be used, including permanent methods such as welding. As shown, one or more washers 110 may be used to accommodate gaps, should they exist, between the base 106 and the structure 104. A threaded rod 112 (or one or more bolts) passes through a first flange 114 and a second flange 116 of the U-shaped clip 102. The configuration of the base 106, first flange 114, and second flange 116 form the U shape of the U-shaped clip 102. In other words, the first flange 114 and the second flange 116 extend perpendicularly to the base 106. The threaded rod 112 couples the U-shaped clip 102 to a subframe structure 118, such as a hollow structural section (HSS) post, as shown, or other structural member. The subframe structure 118 is fastened to an IMP 120 (or other cladding system) such as via self-tapping screws 122A-B or other fasteners known in the art for coupling wall cladding to a structure, to ensure a fixed position (i.e., non-movable) of the wall cladding (IMP 120) in relation to the subframe structure 118. While an HSS post is used in the drawings and some examples herein as the subframe structure 118, it will be appreciated that other structural members may be used, such as a cladding system (as would likely be used for tilt-up or precast concrete walls), other mild steel sections, cold-formed metal sections, lumber, or others.

In some embodiments, the threaded rod 112 passes through a first elongated aperture 124 (best seen in FIG. 3) extending longitudinally along a portion of a first side 126 of the subframe structure 118, and second elongated aperture 128 (FIG. 1) extending longitudinally along a portion of a second side 130 of the subframe structure 118. As shown, each elongated aperture 124, 128 may be in the shape of a vertical slot in the subframe structure 118 and are aligned with one another in the subframe structure 118 (i.e., positioned opposite one another on the first side 126 and second side 130). This alignment allows the threaded rod 112 to pass through the subframe structure 118, while still allowing for vertical movement between the U-shaped clip 102 and the subframe structure 118. In other words, because the subframe structure 118 is not directly coupled to the structure 104, but rather coupled via the threaded rod 112 passing through elongated apertures 124, 128 of the subframe structure 118 and the U-shaped clip 102, the IMP 120 can move independently (e.g., threaded rod 120 sliding vertically in the elongated apertures 124, 128) of the structure 104 sufficiently so as to avoid shearing therefrom or otherwise compromising the envelope when the structure is under a load, such as from a seismic event, wind, or otherwise.

Unlike the coupling of the base 106 to the structure 104, which is a fixed, non-movable position, and the IMP 120 to the subframe structure 118, which is a fixed, non-movable position, the coupling of the subframe structure 118 to the U-shaped clip 102 is not a fixed position, but is allowed to move both vertically (via the elongated apertures 124, 128) and horizontally (along a longitudinal length of the threaded rod 112) to a certain extent, as will be described in more detail herein. This dual-axis movement accommodates complex load patterns during seismic events.

Figure 5:
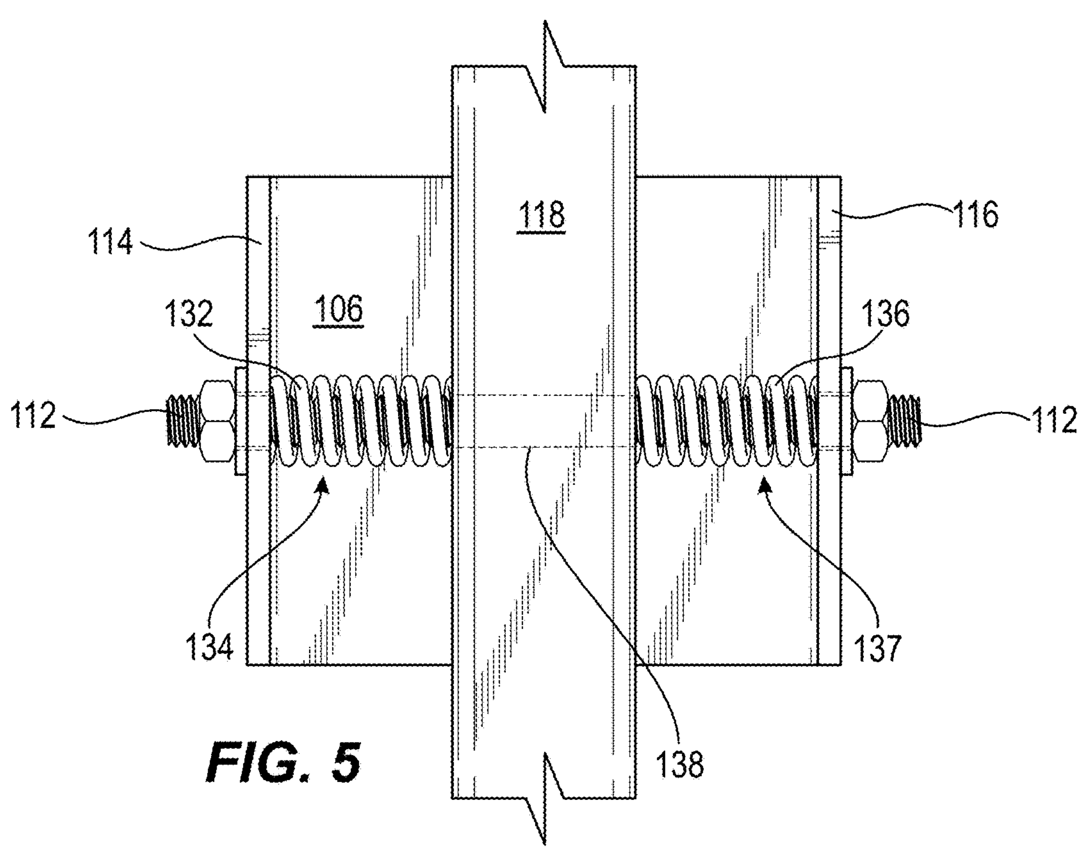
FIG. 5 illustrates a front elevation view of a seismic clip assembly with springs.
Figure 6:
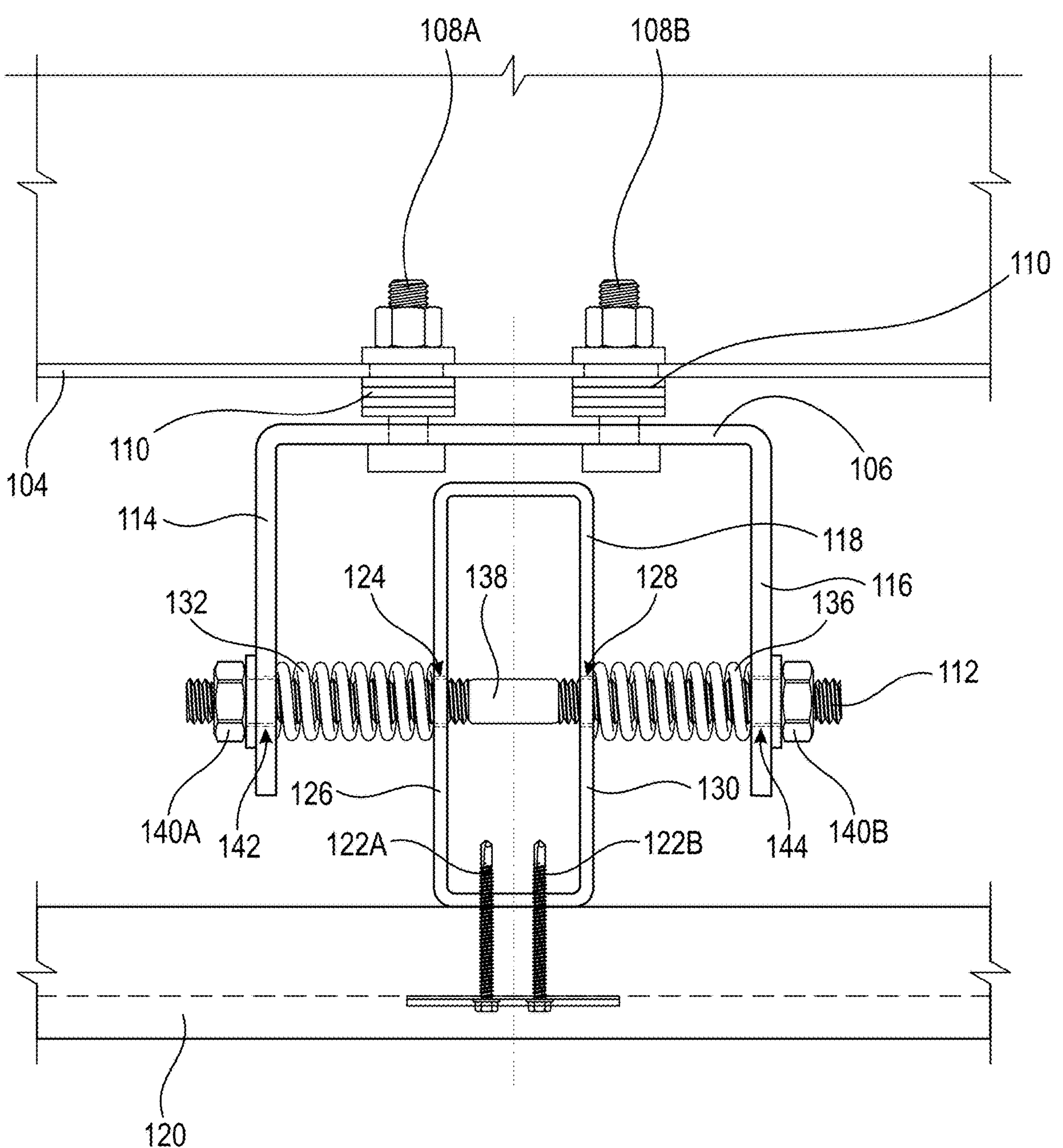
FIG. 6 illustrates a top plan view of a seismic clip assembly with springs coupling wall cladding (e.g., IMP) to a structure.

Referring now to FIGS. 5-6, in some embodiments, the threaded rod 112 may comprise a first spring mechanism 132 on a first portion 134 of the threaded rod 112, the first portion 134 being interposed between the subframe structure 118 and the first flange 114, and a second spring mechanism 136 on a second portion 137 of the threaded rod 112, the second portion 137 interposed between the subframe structure 118 and the second flange 116. The spring mechanisms 132, 136 can be preloaded to a specific tension to optimize their performance under expected load conditions. A center portion 138 of the threaded rod 112 is positioned within the subframe structure 118. While the threaded rod 112 is used as an example herein, and is shown with a smooth center portion 138, it will be appreciated that the entire length of the threaded rod 112 may comprise threads, including the center portion 138, and that the threaded rod 112 may also be substituted with a bolt or similar fastener, rather than being secured at both ends with a respective nut 140A-B. Additionally, the threaded rod 112 may have a majority of its length smooth, with only the ends being sufficiently threaded to receive nuts thereon.

As understood, each spring mechanism 132, 136 may be a coil spring that surrounds the threaded rod 112, a rubber shim, a rubber block, or other compressible/spring material configured to dampen in-plane wall movement and provide energy dissipation to applied in-plane wall loads. As appreciated, the spring mechanisms 132, 136 not only dampen in-plane wall movement and provide energy dissipation, but also aid in returning the assembly to the original position, and therefore the IMP 120 or other wall cladding, when not subjected to force or outside loads, maintaining building aesthetics and integrity, and reducing the need for ongoing repairs.

In some methods of assembly, the U-shaped clip 102 is fastened to the structure 104 by inserting bolts 108A-B (or other fasteners) through the base 106 of the U-shaped clip 102 and through the structure 104. Depending on the position of the U-shaped clip 102 in relation to the structure 104, washers 110 or other spacers may be used between the structure 104 and the base 106 to ensure a fixed coupling. The subframe structure 118 is then positioned between the first flange 114 and the second flange 116, aligning the first elongated aperture 124 of the subframe structure 118 with a first flange aperture 142 of the first flange 114, and aligning the second elongated aperture 128 of the subframe structure 118 with a second flange aperture 144 on the second flange 116.

With the respective apertures 142, 124, 128, 144 aligned, a fastener (e.g., threaded rod 112) may be inserted through the first flange aperture 142, the first spring 132 may be positioned such that the threaded rod 112 then passes through the first spring mechanism 132 and into the subframe structure 118 through the first elongated aperture 124. Once the threaded rod 112 begins to exit the second elongated aperture 128 of the subframe structure 118, the second spring mechanism 136 may be positioned such that the threaded rod 112 passes through the second spring mechanism 136 and through the second flange aperture 144. If a bolt was used as the fastener (rather than a threaded rod 112), then a single nut 140A may be secured. If a threaded rod 112 was used as the fastener (as shown), then a first nut 140A is threaded onto a first end until abutting the first flange 114 (or a washer interposed between the first nut 140A and first flange 114), and second nut 140B is threaded onto the second end until abutting the second flange 116 (or a washer interposed between the second nut 140B and second flange 116).

The selected wall cladding for the structure, such as IMP 120, may then be fastened to the subframe structure 118 using screws 122A-B or other mechanisms known in the art. The spring mechanisms 132, 136 allow for lateral movement, while the first elongated aperture 124 and second elongated aperture 128 allow for vertical movement. The combination of lateral and vertical movement capabilities ensures that the cladding system can adapt to complex load patterns during seismic events. As a result, when a seismic event occurs, which causes the structure 104 to move, that movement is dampened by the seismic clip assembly 100 before reaching the wall cladding (e.g., IMP 120), maintaining the functional and structural integrity of the wall cladding.

The seismic clip assembly 100 is preferably made of steel or other metal components sufficient to sustain the selected wall cladding to the structure and to withstand shear forces and in-plane movement. The U-shaped clip 102 may be of single manufacture, with the first flange 114 and second flange 116 being bent into position from a straight piece of steel. However, other suitable methods, such as welding the flanges 114, 116 to the base 106, may also be used without departing herefrom. Further, in some embodiments, rather than being in a U-shape, the seismic clip assembly 100 may not require a base 106, and instead may comprise a first flange 114 coupled (e.g., welded, bolted, etc.) to a structural component, and a second flange 116 being likewise coupled to the structural component. In other words, the first and second flanges 114, 116, in some embodiments, may be separate components, rather than an integral U-shaped clip 102. Additionally, the first elongated aperture 124 and second elongated aperture 128 may vary in vertical length to accommodate varying positions and movements. The first and second elongated apertures 124, 128 may be designed with rounded edges to reduce stress concentrations and enhance durability. In one non-limiting example, the first elongated aperture 124 and second elongated aperture 128 are each four inches in length, although other lengths, both shorter and longer, may be used. It will be appreciated that the length of the first and second elongated apertures 124, 128 can be customized based on the specific requirements of the building and the expected seismic activity in the area.

The seismic clip assembly 100 has been tested and performed as follows, although this is a non-limiting example:

- The assembly was configured as follows:
  - Coil springs (132, 136) with the following properties:
    - Free length: three inches
    - K: 290 lb/in
    - Coil deflection max: ±one inch
    - Total coils: 7.5
  - HSS post (118): first and second elongated apertures 124, 128 extending four inches vertically along the HSS post.
  - A bolt (112) with a single nut (140A) securing the U-shaped clip 102 to the subframe structure 118.
  - Three, two-inch CF42 26/26 IMP panels (120) directly supported by three, 16 ga girts spaced five feet o/c.
- The load: an in-plane oscillating load was applied at the top girt header, with induced step load incremental increases ranging from 0 lb. up to approximately ±290 lbs.
- Initial observations: the IMP wall cladding remained isolated from the movement of the supporting structure and remained fully intact, both structurally and thermally. At the conclusion of the applied loading/unloading cycles, the attached IMP wall system returned to the original position held before the loads were applied.

Accordingly, it will be appreciated from the foregoing that the seismic clip assembly 100 disclosed herein solves the need for improved solutions that can accommodate in-plane deflections while maintaining the functional and structural integrity of wall cladding systems. This allows IMPs and other wall cladding systems to be safely and effectively used in high-rise buildings, overcoming limitations in the prior art.

While the forgoing examples are illustrative of the principles of the present invention in one or more particular applications, it will be apparent to those of ordinary skill in the art that numerous modifications in form, usage, and details of implementation can be made without the exercise of inventive faculty, and without departing from the principles and concepts of the invention.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A structural seismic clip assembly for coupling exterior wall cladding to a primary building structure, the assembly being configured to support vertical loads of the wall cladding and out-of-plane loads, the assembly comprising:

a U-shaped clip comprising a base, a first flange extending from a first side of the base, and a second flange extending from a second side of the base, the base configured to secure to the primary building structure in a fixed position via one or more fasteners;

a load-bearing subframe structure configured to support the exterior wall cladding in a fixed position relative to the subframe structure, the subframe structure comprising a first vertically elongated aperture on a first side and a second vertically elongated aperture on a second side opposite the first vertically elongated aperture;

a threaded rod configured to extend from the first flange, through the first vertically elongated aperture and the second vertically elongated aperture, and through the second flange, the vertically elongated apertures being configured to permit vertical sliding movement of the subframe structure relative to the U-shaped clip while the U-shaped clip remains fixed to the primary building structure;

wherein the exterior wall cladding is configured to be coupled to the subframe structure; and wherein a first spring mechanism is coupled to a first portion of the threaded rod, the first portion interposed between the first flange and the subframe structure, and a second spring mechanism is coupled to a second portion of the threaded rod, the second portion interposed between the second flange and the subframe structure.

2. The seismic clip assembly of claim 1, wherein the first spring mechanism is a first coil spring and the second spring mechanism is a second coil spring.

3. The seismic clip assembly of claim 1, wherein the one or more fasteners to secure the base to the structure comprise one or more washers or spacers between the base and the structure.

4. The seismic clip assembly of claim 1, wherein the wall cladding is an insulated metal panel (IMP).

5. The seismic clip assembly of claim 4, wherein the IMP is fastened to the subframe structure via one or more screws.

6. A method of using a structural seismic clip assembly for coupling exterior wall cladding to a primary building structure, the method comprising:

interposing the seismic clip assembly between the primary building structure and the exterior wall cladding, wherein a load-bearing subframe structure supports the exterior wall cladding in a fixed position relative to the subframe structure, and a U-shaped clip secured to the primary building structure remains fixed relative to the primary building structure;

permitting vertical movement of the subframe structure relative to the U-shaped clip through at least one vertically elongated aperture of the subframe structure while the U-shaped clip remains fixed to the primary building structure such that when the primary building structure moves vertically during seismic or drift events, vertical load transfer to the exterior wall cladding is reduced; wherein the subframe structure is coupled to the U-shaped clip via a threaded rod passing through a first vertically elongated aperture on a first side of the subframe structure and a second vertically elongated aperture on a second side of the subframe structure; and wherein the threaded rod comprises a first spring mechanism on a first portion of the threaded rod and a second spring mechanism on a second portion of the threaded rod.

* * * * *